April 15, 1958     H. G. FERGUSON     2,830,670
CONTROL OF DIFFERENTIALS FOR TRACTORS
Filed May 28, 1954     4 Sheets-Sheet 1
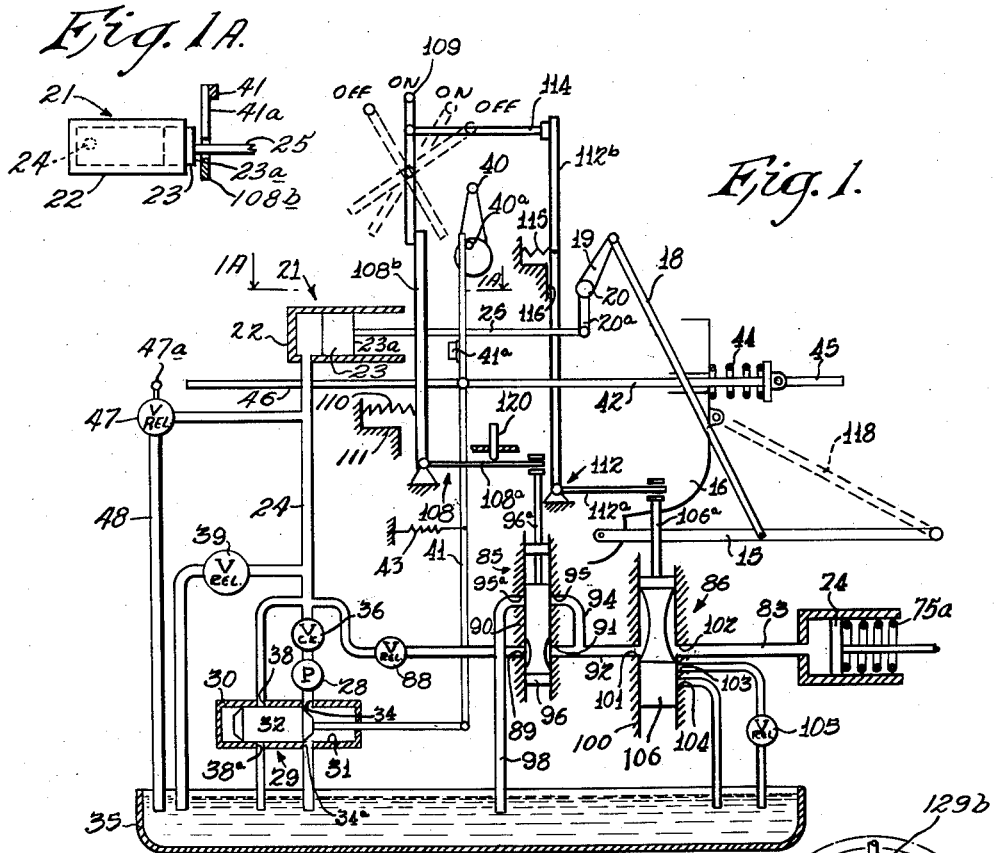
Fig. 1A.
Fig. 1.
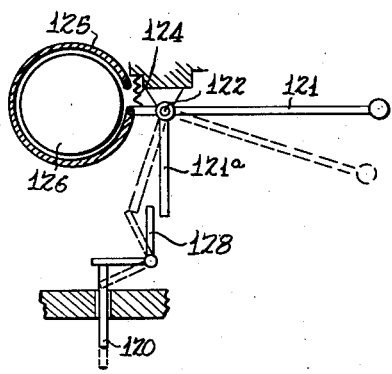
Fig. 3.
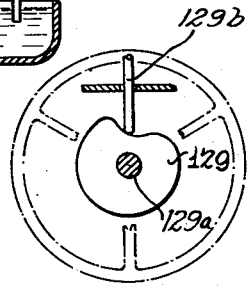
Fig. 4.
Fig. 5.
Inventor
Henry George Ferguson
by Carlson, Pitzner, Hubbard & Wolfe
Att'y's

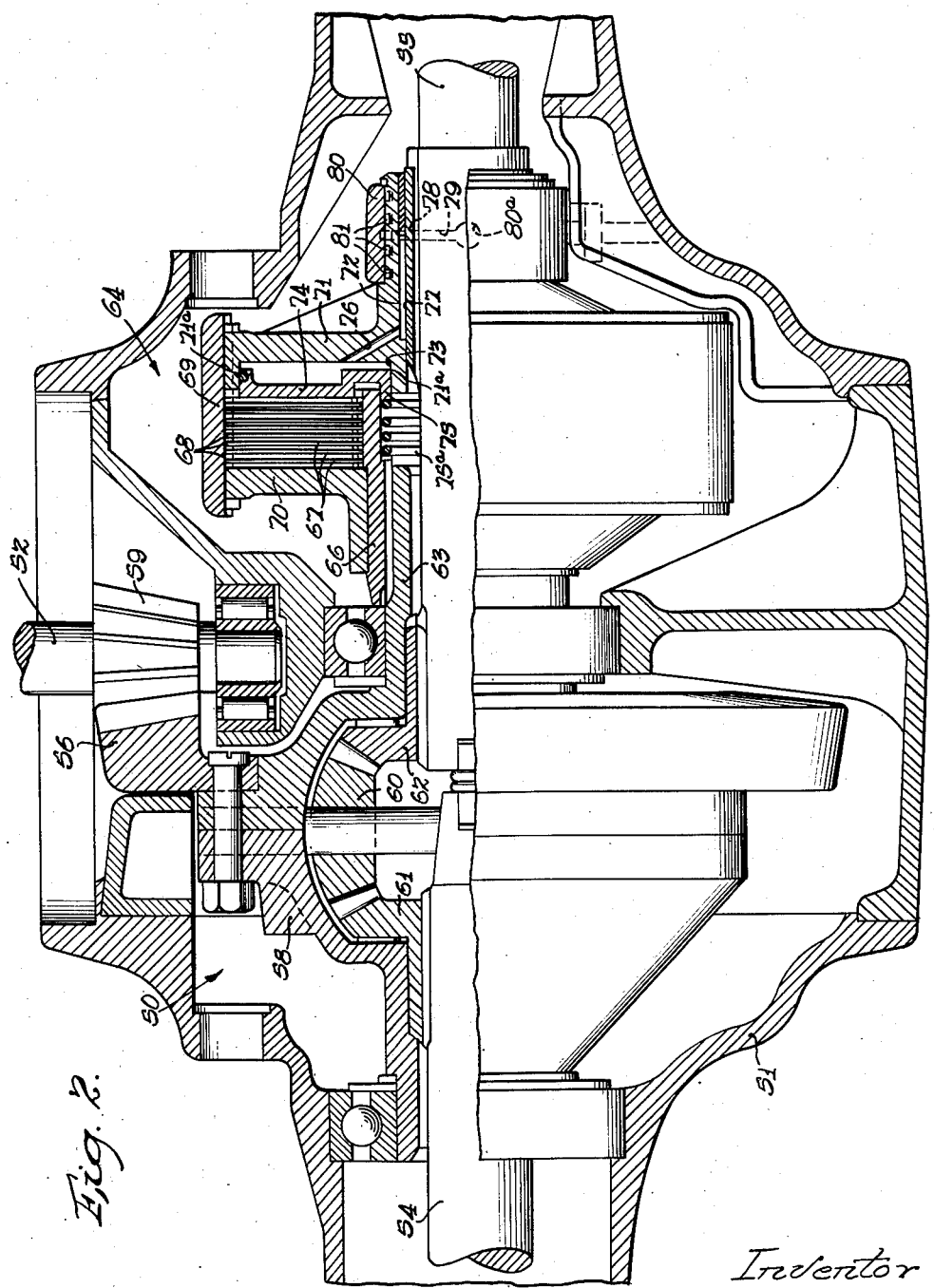

April 15, 1958  H. G. FERGUSON  2,830,670
CONTROL OF DIFFERENTIALS FOR TRACTORS
Filed May 28, 1954  4 Sheets-Sheet 3

Inventor
Henry George Ferguson
by Carlson, Pitzner, Hubbard & Wolfe
Atty's

April 15, 1958  H. G. FERGUSON  2,830,670
CONTROL OF DIFFERENTIALS FOR TRACTORS
Filed May 28, 1954  4 Sheets-Sheet 4

Inventor
Henry George Ferguson
by Carlson, Pitzner, Hubbard & Wolfe
Att'ys

United States Patent Office 2,830,670
Patented Apr. 15, 1958

2,830,670

CONTROL OF DIFFERENTIALS FOR TRACTORS

Henry G. Ferguson, Abbotswood, Stow-on-the-Wold, England, assignor, by mesne assignments, to Massey-Harris-Ferguson Inc., Racine, Wis., a corporation of Maryland Application May 28, 1954, Serial No. 433,107

Claims priority, application Great Britain June 1, 1953

11 Claims. (Cl. 180—75)

The present invention relates in general to arrangements for selectively locking and unlocking differential drive assemblies which transmit power to the traction wheels of tractors. More particularly, the invention is concerned with the control of the differential locking means in a novel, advantageous manner.

It is the general aim of the invention to provide for the control of differential locking means in a manner such that the tractor's traction wheels may be locked for rotation in unison during the course of heavy duty work, while at the same time assuring that the differential will be unlocked automatically under certain operating conditions which might otherwise unduly stress or damage the tractor.

Another object of the invention is to provide locking means for the differential assembly of a tractor which are selectively operable by positioning a manual control member, and further characterized in that locking means are automatically released in response to one or more of the following conditions: (a) the actuation of a pedal operative to apply a brake on one wheel of the tractor, (b) the turning of the steerable wheels through a predetermined angle from their straight ahead position, (c) the operation of overload release means for the implement hitch of the tractor, and (d) the elevation of the implement hitch to transport position.

It is a further object of the invention to make it possible for a tractor operator to smoothly control the degree of force with which differential locking means are engaged according to the nature of the work being done. Tractive effort in excess of selectable degrees, therefore, merely results in slipping of the locking means, and in differential action which prevents undue stress on the tractor drive components, i. e., wheels, axles, etc.

Still another object is the provision of hydraulically actuated differential locking means selectively energized from the hydraulic system of a power-elevatable implement hitch of the type now employed on many tractors, but in which the locking means are susceptible of energization whether or not an implement is being carried on the hitch, and in which blow-off through a safety valve, with consequent foaming and heating of the fluid, is precluded.

In this connection it is an additional object to provide a double valve arrangement for controlling the energization of a differential lock hydraulic actuator, both the valves being independently positioned in a novel manner by a single manual control lever.

Other objects and advantages of the invention will become apparent as the following description proceeds, taken in conjunction with the accompanying drawings, in which:

Figure 1 is a diagrammatic representation of a differential lock control system embodying the features of the invention which is shown in connection with and adapted to be energized from a power-actuated implement hitch system;

Fig. 1A is a plan view as it would appear if taken generally along the line 1A—1A in diagrammatic Fig. 1 if the latter precisely illustrated the relative positions of certain control levers;

Fig. 2 is a plan view, partially in section, of an exemplary tractor differential drive assembly equipped with one form of selectively operable locking or clutch means;

Fig. 3 is a diagrammatic representation of overruling control means actuated in response to operation of a brake pedal on the tractor for releasing the differential lock means;

Fig. 4 is a diagrammatic representation of overruling means actuated in response to turning of steerable tractor wheels through a predetermined angle for releasing the differential locking means;

Fig. 5 is a diagrammatic detail view of overruling means actuated in response to overload release of the tractor hitch linkage;

Figure 6:
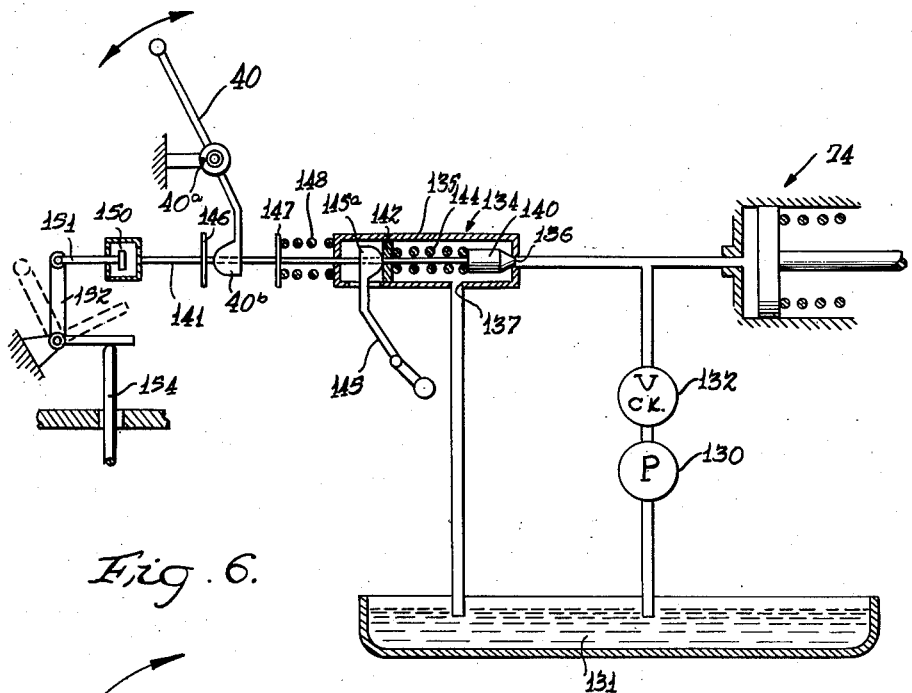
Fig. 6 is a diagrammatic representation of a second embodiment of the invention providing for selection of the force or degree with which differential locking means are engaged.

While the invention has been shown and is described in some detail with reference to particular embodiments thereof, there is no intention that it thus be limited to such detail. On the contrary, it is intended here to cover all modifications, alternative constructions, and equivalents falling within the spirit and scope of the invention as defined by the appended claims.

Referring now to the drawings, one embodiment of the invention has been illustrated in Figs. 1–5 as employed in connection with a power-actuated implement hitch of the type employed on the well known "Ferguson" tractor. Since the details of the hitch may vary somewhat, the system has been only diagrammatically illustrated in Fig. 1; and because the tractor on which the implement hitch of the differential locking controls of the present invention are employed may be of any type, the tractor itself has not been shown.

With reference to Fig. 1, the implement hitch system here illustrated is of the general type shown and claimed in Ferguson U. S. Patent 2,118,180. It is hydraulically powered and provides automatic draft control, transport cut-off and overload release. Briefly, such system comprises a pair of laterally spaced draft links 15 trailingly pivoted at their forward ends to the lower portion of the rear of the tractor body 16, such draft links being adapted at their aft ends to pivotally mount any of a wide variety of implements. For raising and lowering the draft links 15, a pair of drop links 18 are pivotally connected between respective ones of the draft links and two lift arms 19 fast on a rock shaft 20 journaled in the tractor body. The rock shaft is powered for rotation in a counterclockwise direction by energization of a main actuator or one-way ram 21. The latter includes a cylinder 22 in which a piston 23 is axially positioned by the presence or absence of pressure fluid supplied to and drained from the cylinder through a conduit 24. Connection is made from the piston 23 to the draft links through means including a piston rod 25 socketed in the lower end of a radial arm 20a, rigid with rock shaft 20. Thus, the admission of pressure fluid to the cylinder 22 shifts the piston 23 rearwardly (to the right), thereby rocking the rock shaft 20 counterclockwise and causing the drop links 18 to raise the draft links 15 about their pivot connections to the tractor body 16. When the cylinder 22 is vented, the weight of the draft links 15, and any implement on them, causes the piston 23 to retreat into the cylinder and permits the draft links to be lowered by gravitational forces.

For supplying pressure fluid to and venting it from the main actuator 21, a fluid pressure source such as a pump 28 constantly driven from the tractor engine is provided, together with a main control valve 29. The latter includes a body 30 having a cylindrical bore 31 receiving an axially slidable valve plunger 32 which is tapered in diameter on its ends. The body 30 is provided with a pair of pump inlet ports 34, 34a for connecting the intake of the pump 28 to suitable fluid such as oil, in a reservoir 35 when the plunger 32 is shifted to the left, that is, to the "lift" position shown. Under this condition, the pump 28 supplies pressure fluid through a check valve 36 and the conduit 24 to the cylinder 22. The valve body is also provided with exhaust ports 38, 38a located so as to be closed when the plunger 32 is shifted to the left. The exhaust ports connect the cylinder 22 to the reservoir 35 while the intake ports 34, 34a are closed when the plunger 32 is shifted to the right. Under this latter condition, therefore, the fluid in the cylinder 22 is exhausted to the reservoir 35, permitting the draft links 15 to drop under the influence of gravitational forces. The intake ports 34, 34a and the exhaust ports 38, 38a are spaced axially of the body 30 with regard to the axial length of the plunger 32 so that the latter blocks both sets of ports when in an intermediate or "neutral" position, thereby trapping fluid in the cylinder 22. The trapped fluid is pressurized by the weight of the load on the draft links 15 and maintains the latter at a given elevation.

The position of the valve plunger 32 is under the joint control of a hand lever 40, commonly called the "quadrant" lever, and means responsive to draft forces on an implement carried by the draft links 15. For this purpose, a "floating lever" 41 is pivotally connected at its lower end to the plunger 32 and abuts at its upper end with an eccentric 40a on the quadrant lever 40. Further, a control plunger 42, axially slidable within the tractor body 16 under the influence of a biasing control spring 44, is pivoted at a medial point of the floating lever 41. A tension spring 43 urges the lever 41 to rock clockwise about the plunger 42, so that the top of the lever is biased into abutment against the eccentric 40a. The plunger 42 is adapted to be shifted fore and aft in response to increases and decreases in draft forces on an implement by a top or control link 45 which, in a well known manner, is adapted for pivotal connection at its rear end to the upper part of an implement mounted on the draft links 15.

In order to lower the draft links, the quadrant lever 40 is rocked counterclockwise to pivot the floating lever 41 against the bias of the spring 43 about the plunger 42 as a fulcrum, and thereby shifting the plunger 32 to the right to uncover the exhaust ports 38, 38a and close the intake ports 34, 34a. As an implement, such as a plow, is drawn through the soil, draft forces tend to rock it forwardly about its pivotal connection with the draft links 15, thereby exerting a forward force on the control link 45 which shifts the plunger 42 against the biasing spring 44. This in turn rocks the floating lever 41 clockwise about the eccentric 40a as a fulcrum to shift the plunger 32 to the left until the latter is placed in neutral position, i. e., the ports 38, 38a closed. If the draft forces exceed a value selected by the position of the quadrant lever, the plunger 32 is shifted farther to the left to open the intake ports 34, 34a and cause lifting of the implement until the draft forces are reduced to the selected value.

In order to raise the draft links 15 and lift an implement out of engagement with the ground, the quadrant lever 40 is rocked clockwise so that the floating lever 41 pivots clockwise under the influence of the spring 43 about the plunger 42 and shifts the valve plunger 32 to the left, i. e., to the position shown. This opens the ports 34, 34a and supplies pressure fluid to the main actuator 21 until the implement is elevated to a predetermined or "transport" position.

For limiting the maximum elevation of the draft links 15 to a predetermined transport position, automatic transport cut-off means are provided which operate in the usual well known manner. Briefly, such an arrangement may include an abutment 41a on the floating lever 41 adapted for engagement by the skirt 23a of the piston 23 as it emerges from the cylinder 22. When the draft links are raised to a predetermined position, therefore, the piston 23 shifts the floating lever 41 counterclockwise about the eccentric 40a to neutralize the valve plunger 32.

The hydraulic system for the illustrated implement hitch is also usually equipped with overload release means (Fig. 1) which are fully described in the above-mentioned Patent 2,118,180 and which are familiar to those skilled in the art. Such overload release means may take the form of an extension 46 on the forward end of the plunger 42 which is adapted to contact the actuator 47a and open a safety valve 47 in response to predetermined excessive draft forces on an implement. The safety valve 47 is connected by conduit 48 to dump the fluid in the cylinder 22 back into the reservoir 35. The implement (not shown) supported on the draft links is thus released or dropped. This results in a marked reduction in the vertical component of draft on the tractor, lightening the load on the tractor's rear wheels and permitting them to spin harmlessly. Undue stress and breakaage of implement or tractor components is thus prevented. When the overload release occurs, the tractor operator may simply back the tractor, reset the safety valve, lift the implement out of the ground to clear the obstruction, and then proceed in the usual way.

In accordance with the invention, the tractor is equipped with a differential drive assembly 50 (Fig. 2) for transmitting power to the rear traction wheels, together with means for selectively locking and unlocking the differential. The arrangement shown in Fig. 2 is substantially the same as that disclosed in Senkowski U. S. application, Serial No. 407,973 filed February 3, 1954. It comprises a differential housing 51 containing the drive assembly 50 which is driven by a propeller shaft 52 powered from the tractor engine. The assembly 50 normally drives with differential freedom oppositely extending axles 54, 55. The latter extend transversely of the tractor to receive the rear traction wheels (not shown). The differential drive assembly further includes a ring gear 56 fast on a planet carrier 58 and meshed with a pinion 59 on the rear end of the propeller shaft 52. The planet carrier 58 mounts four planet gears 60 cooperatively engaged with bevel gears 61, 62 secured to the respective axles 54, 55.

In order to afford selective locking of the differential, the carrier 61 is extended in the form of a sleeve 63 which has connection with one of the elements of a differential locking means here shown as a friction clutch 64. This connection consists of a stepped ring 66 keyed to the sleeve 63 and having a pack of thin annular clutch plates 67 feathered to the ring for axial sliding movement relative to the ring 66 but for rotation therewith.

The clutch 64 further includes a pack of complementary clutch plates 68 which are interleaved with those of the first pack and have a similar feathered connection to the peripheral wall 69 of an annular casing otherwise comprising an inner annular end wall 70 rotatable on the ring 66 and an outer end wall 71 having a sleeve extension 72 keyed to the axle 55. This latter wall 71 has inturned flanges 71a, which form a shallow annular cylinder 73 containing an annular clutch-actuating piston 74. The latter engages the end clutch plate and has an extension 75 embracing the ring 66 and engaging a biasing spring 75a. The spring abuts a step in the ring 66 and normally urges the piston 74 to the right so as to disengage the clutch plates 67, 68. Radial inclined passages 76 connect the cylinder 73 with an annularly arranged series of passages 77 in the extension 72, these passages communicating with a series of radial ports 78. The ports 78 in turn communicate with a passage 79 in a stationary collar 80. The sleeve 72 rotates within the collar 80 and is sealed with respect to the latter by a plurality of packing rings 81. This arrangement affords a continuous hydraulic path between the cylinder 73 and a suitable conduit 83 (shown in Fig. 1) adapted for connection to a radial opening 80a.

It will be evident that when oil is admitted to the cylinder 73 the piston 74 compresses the two packs of clutch plates 67, 68 and so locks together the axle 55 and the planet carrier 58. This locks the differential assembly 50 and forces the axles 54, 55 to be driven in unison. Of course, when the cylinder 73 is vented, the piston 74 shifts to the right under the influence of the spring 75a, thus unlocking the clutch plates. It is also to be noted that the pressure of hydraulic fluid admitted to the cylinder 73 controls the degree of force with which the clutch plates are engaged. It therefore controls the maximum force transmittable by the clutch before slippage of the plates. The cylinder 73 and piston 74, in the arrangement shown, constitute a compact and effective auxiliary hydraulic actuator for controlling the engagement and disengagement of the friction clutch 64.

In many of the several diverse uses to which modern agricultural tractors are put, it is desirable to lock the tractor differential so as to prevent loss of all traction upon spinning of but one traction wheel. For example, in heavy plowing, in pulling stumps, in mowing wet grass, and in many other operations, locking of the tractor differential assembly 50 permits the successful accomplishment of the work which might otherwise be impossible if one of the traction wheels slipped.

Yet, the caution must be observed that with the differential assembly 50 locked, there is a very real possibility of damaging the tractor drive components, i. e., the wheels, the axles 54, 55 and the differential gears, if the conditions are such as to cause widely different torques on the two axles.

For example, many modern tractors are provided with individual brakes for the two traction wheels. If one brake should be applied there will be a tendency to overload the differential gearing and in such instance it is necessary to free the differential for normal action. Further, when the tractor is put through relatively sharp turns it is also necessary to permit free differential action in order that the outer wheel may rotate faster than the inner wheel. Still further, it may be observed that when a ground working implement is carried by the tractor hitch it is desirable that the differential assembly 50 be freed when the implement is raised from engagement with the ground in order that the tractor may be turned, for example, at the headland in a plowing operation. Finally, the very nature of the overload release mechanism requires that the lightening of the load on the tractor wheels result in slippage. If the differential is locked, a considerably greater forward force will be exerted on the implement before the wheels spin. On the other hand, if the differential is unlocked, spinning of only one wheel destroys the pulling force of the tractor and for this reason it is desirable that the differential be automatically unlocked when overload release occurs.

The present invention is intended not only to provide selective energization of the differential lock actuator from the hydraulic hitch system, but to further make certain that the differential is unlocked under conditions such as those set forth above.

Energization of the hydraulic clutch actuator 74 is effected from hydraulic pressure existing in the implement hitch system by a novel control arrangement organized in accordance with the invention as illustrated by heavy lines in Fig. 1. The control system there shown comprises first and second multi-position control valves 85, 86 which are serially connected between the pressure side of the pump 28 and the differential lock actuator 74. The first valve is intended to control the energization of the actuator 74 when an implement is being carried on the draft links 15 and fluid in the main actuator 21 and the conduit 24 is pressurized by the weight of such implement. The second control valve 86 is intended to control the energization of the actuator 74 when no implement is being carried on the hitch, such control being effected in a manner to prevent pumping through the relief valve 39. Pressures employed for the main actuator 21 may be relatively great, for example, as high as 2,000 p. s. i., and the auxiliary actuator 74 is intended to operate normally at a lower pressure, for example, 200 p. s. i.

With this in view, the control system further includes a pressure reducing check valve 88 connecting the discharge side of the pump 28 with an input port 89 formed in the housing 90 of the first valve 85. The input port 89 is disposed opposite an outlet port 91 leading through a conduit 92 to the second valve 86 and also through a conduit 94 to exhaust ports 95, 95a defined opposite one another in the valve housing 90. The valve 85 has a double waisted cylindrical member 96 axially slidable within the body 90 between two positions, (a) in which the ports 89, 91 are connected and (b) in which the ports 95, 95a are connected, respectively. In the first position fluid is transferred directly to the second valve while the exhaust ports 95, 95a are closed, as shown. When the member 96 is shifted downwardly, the ports 89, 91 are closed to interrupt communication with the discharge side of the pump 28, while the exhaust ports 95, 95a are opened permitting fluid to be vented through the conduits 92, 94 and through another conduit 98 leading to the reservoir 35.

The second valve 86 is formed of a housing 100 provided with an inlet port 101 to which the conduit 92 is connected, and with three axially spaced ports 102—104 connected by suitable conduits to the auxiliary actuator 74, to the reservoir 35 through a low pressure relief valve 105, and directly to the reservoir 35, respectively. A cylindrical valve member 106 having a single, relatively long waist, is slidably disposed in the housing 100 and adapted to have three operating positions. In the first position illustrated, the actuator 74 is connected directly with the conduit 92; with the member 106 shifted downwardly a slight amount, the port 103 is brought into communication with the conduit 92 and the actuator 74 so that pressure in these is maintained at a relatively low value depending upon the setting of the relief valve 105; and when the member 106 is shifted still further in a downward direction, the conduit 92 and the actuator 74 are vented through the port 104 directly to the reservoir 35. The valve members 96 and 106 are controlled in a manner such that each is in its first position, as illustrated, when the other one is in its second or third position.

For controlling the position of the first valve member 96, a first linkage is provided which includes an extension rod 96a coupled to one arm 108a of a pivoted bell crank 108. The other arm 108b of the bell crank extends alongside the aft end of the main actuator cylinder 22, for a purpose to be described, and into cooperative relation with the lower end of a multi-position manual control lever 109.

The bell crank 108 is normally maintained in the position illustrated by a yieldable biasing spring 110 urging the arm 108b against a stop 111. Thus, with the control lever in the position illustrated by solid lines the valve member 96 is held in the position illustrated to establish communication between the discharge side of the pump 28 and the actuator 74. On the other hand, when the control lever 109 is rocked counterclockwise, its lower end engages the upper end of the arm 108b rocking the bell crank 108 clockwise and shifting the valve member 96 downwardly. This cuts off the supply of pressure fluid to the actuator 74, and vents the latter through ports 95, 96 to the reservoir 35. With the valve member 106 in the normal position illustrated, therefore, rocking of the control lever 109 between two positions serves to energize and deenergize the actuator 74 and thus to lock and unlock the differential assembly 50.

For controlling the position of the second valve member 106, it is provided with an extension rod 106a connected to one arm 112a of a pivoted bell crank 112. The latter has a second arm 112b extending vertically upward to have one-way abutting engagement with a link 114 operatively connected to the manual control lever 109 and thereby shifted axially in response to rocking of that lever. Movement of the control lever to the left from the position illustrated thus has no effect on the position of the second valve member 106 and the latter is normally maintained in the position illustrated by a yieldable biasing spring 115 urging the arm 112b against a stop surface 116.

When the lever 109 is rocked clockwise through a first predetermined angle from the position shown in solid lines, the link 114 rocks the bell crank 112 clockwise thereby shifting the valve member 106 downwardly to interconnect the ports 101, 102, and 103. This assures that the pressure in the conduit 92 and the actuator 74 cannot exceed the relief setting of the valve 105. When the control lever 109 is rocked still further to the right, the bell crank 112 shifts the valve member 106 to its lowermost or third position thus venting the actuator 74 and releasing the differential locking clutch.

In the operation of the differential lock and control means, therefore, when an implement is being carried on the draft links 15, the operator may manually cause locking and unlocking of the differential simply by rocking the lever 109 between the vertical and left positions illustrated. When the lever 109 is vertically positioned, the valve member 96 is in the position shown so that pressure fluid from the discharge side of the pump 28 is passed directly through the valves 85 and 86 to the actuator 74, thereby locking the differential. Even if the main control plunger 32 is shifted to its neutral position, thereby blocking the intake of the pump 28, the weight of an implement on the draft links 15 pressurizes fluid in the cylinder 22 so as to create the necessary pressure for energization of the actuator 74. When the operator moves the handle 109 to the left and shifts the valve member 96 downwardly, pressure is not destroyed in the hitch controlling system since the valve port 89 is blocked. However, the actuator 74 is directly vented through the ports 95, 95a to unlock the differential.

When no implement is being carried on the draft links 15 as the quadrant lever 40 is shifted so as to open the intake ports 34, 34a for the pump 28, the draft links will rise until they reach transport position. At that time, the automatic transport cut-off arrangement previously described causes the valve plunger 32 to be neutralized thereby trapping fluid in the main cylinder 22 but with relatively little pressure since there is no weight on the draft links. Under these conditions, therefore, the differential clutch actuator 74 could not be energized.

In order to obviate this difficulty when it is desired to utilize the differential lock without an implement on the draft links, staybars or struts 118 may be connected between the draft links 15 and the tractor body 16, thereby preventing the draft links from rising and a consequent closure of the intake ports 34, 34a. The valve plunger 32 may be permanently set in the position illustrated simply by rocking the quadrant lever 40 in a clockwise direction. However, this leaves the pump 28 in continuous operation and very high pressures may result causing blow-off or pumping through the high pressure relief valve 39. Pumping through this valve for an appreciable period of time causes loss of power through foaming and heating of the fluid. It is to the elimination of such pumping through the valve 39 that the use of the second control valve 86 is directed.

With the staybars 118 connected between the draft links and the tractor as shown, the operator sets the manual control lever 109 in the first position inclined to the right, thereby causing the valve member 106 to establish communication between the ports 101, 102, and 103. Thus, the actuator 74 is energized by pressure created by the pump 28, but this pressure is limited to relatively low value, in the order of 200 p. s. i., by the venting action of the relief valve 105. Accordingly, the pressure in the system does not exceed that determined by the relief valve 105 and no blow-off through the high pressure relief valve 39, with attendant heating and aeration of the fluid, occurs. If the operator desires to unlock the differential he need only shift the control lever 109 to its extreme right position thereby venting the actuator 74, as well as the pump 28, through the port 104.

Simple on-off control of the differential locking means is thus afforded by a single control lever 109 either when the tractor is employed with an implement on the draft links 15 or is employed with the staybars 118 in lieu of an implement. The energization of the locking actuator 74 is accomplished from existing means for creating fluid pressure, namely, the pump 28 for the hitch hydraulic system, but at the same time blow-off through the high pressure relief valve 39 is precluded.

In accordance with another feature of the invention, means are provided for venting the hydraulic actuator 74 and thus for unlocking the differential automatically whenever the operating conditions of the tractor are such as to require differential action in order to prevent possible damage to the tractor drive components.

In certain operations, such as plowing, when the headland is reached, the plow is lifted from the ground to permit turning by shifting the quadrant lever 40 to its "lift" position. This causes the piston 23 to be shifted to the right in the cylinder 22 until the implement reaches transport position. In order to have the differential automatically unlocked as an incident to raising of the implement to transport position, the arm 108b of the bell crank 108 is disposed so as to be contacted by the skirt 23a of the piston 23 as it emerges from the cylinder 22 in reaching transport position. Since Fig. 1 is diagrammatic in form, the arm 108b and the abutment 41a on the lever have been shown, for clarity, separated axially of the piston 23. It should be readily understood, however, that the arm 108b and the abutment 41a may be disposed in side-by-side relation across the rear of the cylinder 22 so that they are both shifted by the piston 23 as its skirt emerges. The resultant clockwise rotation of the bell crank 108 shifts the valve member 96 downwardly, thus venting the actuator 74 through the port 95, 95a and automatically unlocking the differential. The main cylinder 22 is, however, not vented because the port 89 is simultaneously closed. The implement, therefore, remains in transport position until the operator readjusts the quadrant lever 40.

Additional means are also provided for automatically venting the actuator 74 in response to other conditions requiring free differential action. For this purpose, an overruling pin 120 is disposed adjacent the arm 108a of the bell crank 108 and adapted, when shifted downwardly, to position the valve member 96 in its second or lower position. This pin 120 is thus arranged, for example, to rock the bell crank 108 whenever an individual brake is applied, whenever the steering wheels of the tractor are turned through a predetermined angle from their straight ahead position, or when the overload release means for the implement hitch are operated.

Referring next to Fig. 3, an arrangement is there diagrammatically illustrated for shifting the overruling pin 120 when an individual wheel brake pedal 121 is depressed. As here shown, the brake pedal 121 is pivoted as at 122 and biased to its normal horizontal position by a suitable spring 124. The end of the pedal 121 is connected with a brake band 125 which surrounds a brake drum 126 on one of the tractor wheels. Depressing the brake pedal 121 thus clamps the band 125 around the brake drum 126. At the same time, an integral finger 121a on the pedal 121 engages one arm of a bell crank 128 which in turn is rocked to shift the overruling pin 120. As explained previously, the pin 120 thus rocks the bell crank 108 (Fig. 1) to shift the valve member 96 downwardly, thereby venting the actuator 74 and automatically unlocking the differential.

For automatically unlocking the differential when the tractor's steerable wheels are turned, an arrangement such as that diagrammatically illustrated in Fig. 4 may be employed. Briefly, this arrangement includes a cam 129 mounted fast on a shaft 129a which carries the tractor steering wheel. The cam is formed with a periphery reduced in diameter over a relatively narrow range, and cooperates with a cam-following pin 129b. As, the steering wheel is turned from its "straight ahead" position, the cam 129 shifts the follower pin 129b. The latter is operatively linked by means (not shown) to correspondingly shift the overruling pin 120 in Fig. 1. This, in turn, automatically unlocks the differential as explained before.

Referring next to Fig. 5, an arrangement for automatically unlocking the differential in response to overload release of the implement hitch is there shown. This may comprise simply an extension 42a on the control plunger 42 so disposed with regard to the overruling pin 120 that upon extreme forward displacement of the plunger 42, the overruling pin 120 is shifted. This is the condition that obtains upon overload release of the implement hitch and, as explained, the shifting of the overruling pin 120 automatically vents the actuator 74 to unlock the differential.

While but a single overruling pin 120 has been illustrated in Fig. 1, it is to be understood that one or more of such pins may be employed for shifting the bell crank 108 in response to one or more of the enumerated conditions requiring differential action. Alternatively, the several mechanisms responsive to these conditions may be made operative upon the same overruling pin which, in turn, shifts the bell crank 108. This automatic release of the differential lock, of course, occurs regardless of the setting of the manual control lever 109. The tractor driver need not concern himself with the duty of shifting the lever 109 to the "off" position to prevent damage to the tractor's drive components.

Turning now to the second embodiment of the invention diagrammatically illustrated in Fig. 6, the hydraulic actuator 74 for selectively engaging the differential clutch 64 is there intended to be energized from an independent fluid pressure source shown as a continuously driven pump 130 having its input in communication with fluid, such as oil, in a reservoir 131. The discharge side of the pump 130 is connected directly to the actuator through a check valve 132.

In accordance with the invention, means are provided not only for the on-off control of the actuator 74, but also for controlling the degree of force with which the actuator causes engagement of the friction clutch 64 previously described with reference to Fig. 2. As illustrated in this instance, such means comprise an adjustable by-pass valve 134 connected between the output of the pump 130 and the reservoir 131 and arranged to be under the manual control of the tractor operator so that pressure supplied to the actuator may be smoothly varied between substantially zero and the maximum pressure which the pump 130 is capable of producing.

The adjustable by-pass valve 134, as here shown, includes a casing 135 having inlet and outlet ports 136, 137 connected to the actuator and reservoir respectively. A tapered plunger 140 is shiftable within the casing 135 so as to vary the effective area of the inlet port 136, and thus the pressure supplied to the actuator 74. For this purpose, the plunger 140 is provided with an elongated rod 141 coaxially surrounded by a relatively slidable collar 142 which is in turn slidably engaged with the interior wall of the casing 135. A coiled compression spring 144 is interposed between the plunger 140 and the collar 142 to bias the plunger toward full closing relation with the port 136. For axially positioning the collar 142 and thereby changing the biasing force of the spring 144 so as to adjust the pressure which the plunger 140 maintains in the system, a control lever 145, manually operable by the tractor operator, is pivoted on the tractor and provided with an apertured head 145a slidable along the rod 141. Rocking the lever 145 clockwise or counterclockwise thus shifts the collar 142 and varies the force of the spring 144 to respectively increase and decrease the pressure maintained in the system by the by-pass valve 134. Friction or detent means (not shown) are employed to yieldably maintain the lever 145 in any selected setting.

In order to make possible the automatic venting of the actuator 74 whenever the implement hitch is raised to transport position, a lost motion connection is provided between the quadrant lever 40 and the valve rod 141. The connection is such that when the quadrant lever is rocked clockwise to its extreme "lift" position, the plunger 140 is fully retracted from the port 136. As here shown, the quadrant lever 40 is provided with a bifurcated extension 40b slidable along the rod 141 between fixed collars 146, 147. Thus, when the quadrant lever 40 is rocked to its extreme clockwise position, the extension 40b strikes the collar 146 and retracts the plunger 140 from the port 136 against the biasing force of the spring 144. A second compression spring 148 may be interposed between the casing 135 and the collar 147 to augment this action. By this provision, therefore, whenever the tractor operator shifts the quadrant lever 40 to raise an implement on the hitch, the spring 144 is overruled, regardless of the setting of the control lever 145 so that the differential is automatically unlocked. This permits turning at the headland, for example when plowing, without manipulation of the lever 145.

Further provision is made in the system of Fig. 6 for automatically venting the actuator 74 in response to the existence of other conditions requring free differential action, regardless of the setting of the manual control 145. For this purpose, the rod 141 is provided with a lost motion connection at 150 with a link 151 pivoted to a bell crank 152. The latter is operatively associated with an overruling pin 154 which, when shifted upwardly, as shown, rocks the bell crank counterclockwise and causes the link 151 to withdraw the plunger 140 from the port 136, thereby overruling the spring 144 regardless of the setting of the control lever 145. The overruling pin 154 may be actuated in response to operation of a brake pedal, turning of the tractor steering wheel, or operation of the overload release means for an implement hitch, as explained in connection with Figs. 3, 4, and 5, respectively.

Figure 7:
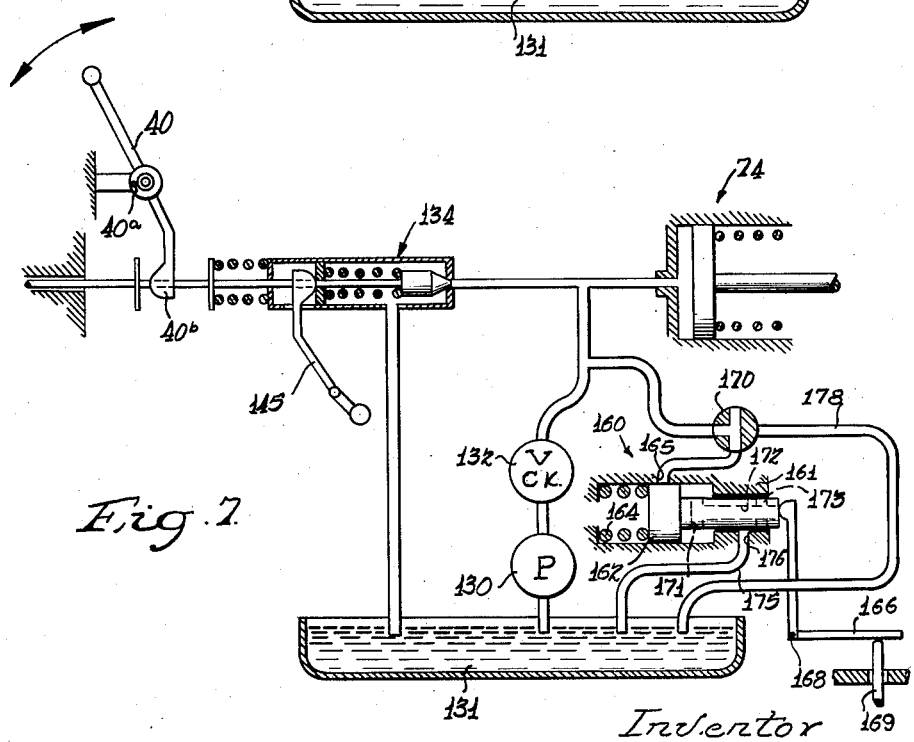
Fig. 7 is a diagrammatic illustration of a modification of the control system illustrated in Fig. 6.

Turning next to Fig. 7, a third embodiment of the invention is there illustrated which is generally similar to that shown in Fig. 6. However, in this instance, rather than a lost motion linkage between an overruling pin and the pressure adjusting valve 134, a second valve 160 is employed for automatically venting the actuator 74 in response to the existence of one or more of the enumerated conditions evidencing need for free differential action.

The organization of the pressure adjusting valve 134 and its overruling connection with the quadrant lever 40 is the same as previously described, and for this reason Fig. 7 is only a fragmentary illustration.

The valve 160 comprises a body 161 having a stepped valve member 162 shiftable therein against the force of biasing spring 164. The spring normally urges the member 162 to cover an inlet port 165 formed in the body, while the member 162 extends from within the body for engagement with a bell crank 166 pivoted as at 168 for rocking in response to shifting of an overruling pin 169. The latter is adapted for actuation in response to depression of a brake pedal, turning of the tractor steering wheel, or overload release as explained previously in connection with Figs. 3, 4, and 5, respectively.

When the overruling pin 169 is shifted upwardly, the bell crank 166 is rocked counterclockwise to shift the valve member 162 inwardly. This uncovers the port 165 and vents fluid from the actuator 74 through a three-way cock 170 and through passages 171, 172 and 173 in the member 162 to a conduit 175 leading from an outlet port 176 to the reservoir 131. Any pressure in the system acting on the inner face of the head of the member 162 holds the latter in the venting position against the force of the biasing spring 164. Thus, very little force is required of the bell crank 166 to shift the valve member 162. The valve will remain open as long as any appreciable pressure exists in the system. In order to reclose the valve 160, the operator may turn the three-way cock 170 so as to vent the output of the pump 130 directly to the reservoir 131 through a conduit 178. Resetting the cock 170 to its original position then returns the system to its orginal condition ready for automatic deenergization of the acuator 74 whenever any of the predetermined conditions occur which result in shifting of the overruling pin 169. It will be apparent that by this arrangement, the actuator 74 is automatically deenergized to release the differential lock whenever the pin 169 is shifted regardless of the setting of the manual control lever 145.

Figure 8:
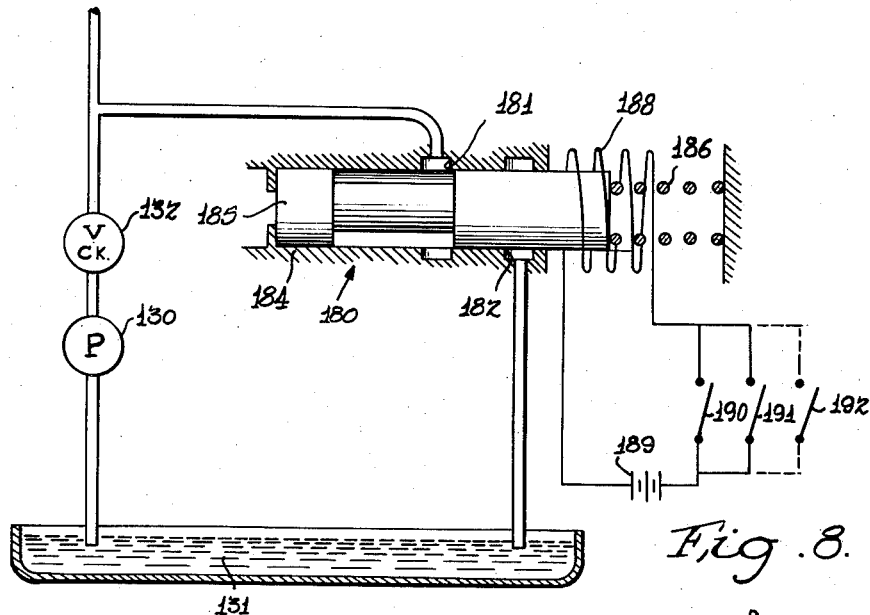
Fig. 8 is a fragmentary diagrammatic illustration of a modified form of the overruling control valve illustrated in Fig. 7.

Referring next to Fig. 8, the fourth embodiment of the invention there illustrated is generally similar to that described with reference to Fig. 7. In this instance, an overruling valve 180 is provided to vent the actuator 74 through inlet and outlet ports 181, 182 defined in the valve body 184. The ports are normally closed by a waisted valve member 185 axially slidable in the body 184 and urged to the left by a biasing spring 186. For shifting the valve member 185 to the right, and thus establishing communication between the ports 181, 182 to vent the clutch actuator, a solenoid 188 is cooperatively disposed around a part of the valve member. The solenoid is connected in circuit with a suitable voltage source 189 through a plurality of parallel switches 190—192. These switches are arranged to be closed in response to operating conditions of the tractor which require free differential action. These may be, as explained, actuation of a brake pedal, turning of the tractor steering wheel, or operation of overload release means, respectively, as explained in connection with Figs. 3, 4 and 5.

Figure 9:
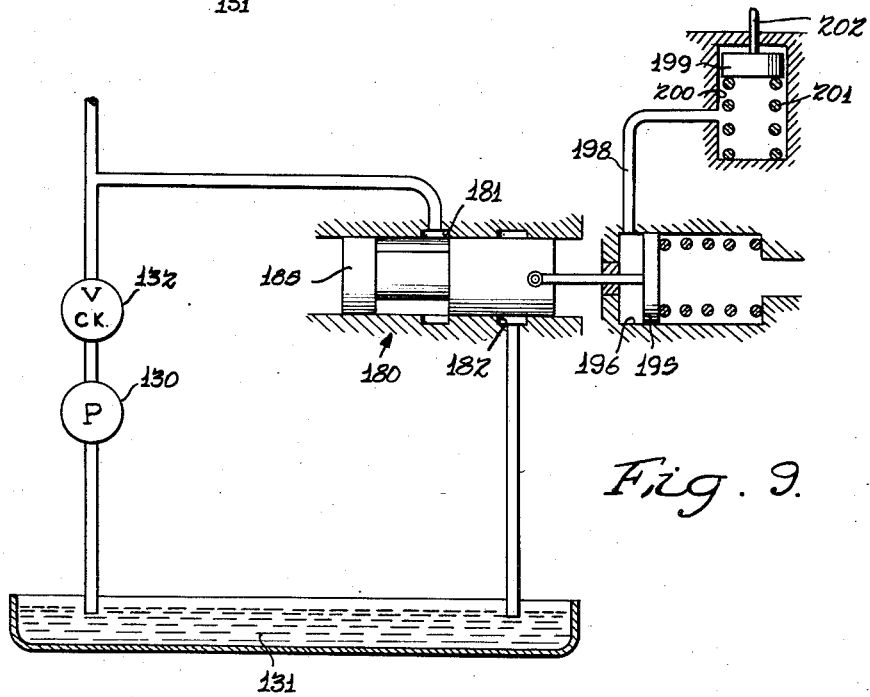
Fig. 9 is similar to Fig. 8, diagrammatically illustrating still another form of the overruling control valve shown in Fig. 7.

A fifth embodiment of the invention has been diagrammatically illustrated in Fig. 9 in which hydraulically operated overruling means are provided for automatically unlocking the differential in response to the presence of working conditions requiring free differential action. The arrangement is generally similar to that shown in Fig. 8, employing a valve 180 selectively positionable to vent the actuator for the differential clutch. However, in this instance, the valve member 185 is shifted to the right from its closing position by means of a slave piston and cylinder 195, 196, when the latter is supplied with fluid pressure through a conduit 198. For this purpose, a master piston and cylinder 199, 200 is connected with the conduit 198 and filled with suitable fluid. The piston 199 is urged to its uppermost position by a suitable biasing spring 201 and is integrally connected with an overruling pin 202. The latter is adapted, as previously explained to be shifted downwardly in response to one or more of the enumerated conditions, i. e., depression of a brake pedal, turning of a steering wheel, or operation of an overload release means. When the piston 199 is shifted downwardly, it pressurizes fluid in the cylinder 200 which in turn shifts the piston 195 and the valve member 185 to the right. This connects the ports 181, 182 and vents the clutch actuator 74 to automatically free the differential.

I claim:

1. In a tractor having a differential drive assembly for transmitting power to its traction wheels, the combination comprising clutch means for locking and unlocking said differential, an actuator for selectively controlling said clutch means, a manual control for selectively energizing and deenergizing said actuator to thereby lock and unlock said differential, an electric switch mounted on the tractor and adapted to be actuated by a movable instrumentality of the tractor when the latter is in a position evidencing need for differential action of said differential assembly, and means responsive to the actuation of said switch for deenergizing said actuator regardless of the setting of said manual control to thereby automatically unlock said differential assembly.

2. For use on a tractor having a differential drive assembly for transmitting power to its traction wheels, the combination of clutch means for locking and unlocking said differential, a hydraulic actuator for selectively controlling said clutch means, a source of pressure fluid, a manually controlled valve for applying and venting pressure fluid to and from said actuator, a master actuator adapted to contain fluid and having a ram adapted to be shifted by a movable instrumentality of the tractor when the latter is in a position evidencing need for differential action of said assembly, a hydraulic slave actuator adapted to be operated in response to fluid pressure in said master actuator, and an overruling valve controlled by said slave actuator upon operation thereof to vent fluid from said clutch means actuator.

3. In a tractor, the combination comprising a differential drive assembly for transmitting power to the traction wheels, friction clutch means for locking and unlocking said differential assembly, power means for actuating said clutch means, and means including a control member independent of the other tractor controls and movable to a plurality of positional settings by an operator for adjusting the force with which said power means actuate said clutch means, whereby the tractive effort necessary to cause slippage of said clutch means and thus prevent undue stress on the tractor may be varied according to the various working conditions under which the tractor is employed.

4. For use on a tractor having an elevatable implement hitch, a source of pressure fluid, a main hydraulic actuator, a main control valve shiftable manually and in response to draft forces for controlling the supply of pressure fluid to said actuator, and a high pressure relief valve for preventing the pressure in the actuator below a predetermined value; an improved differential drive comprising, in combination, a differential drive assembly for transmitting power to the wheels of the tractor, clutch means associated with said differential assembly for locking and unlocking the same, an auxiliary hydraulic actuator for engaging and disengaging said clutch means in response to the presence and absence of pressure fluid therein, means including first and second control valves for selectively establishing communication between the main actuator and said auxiliary actuator, means for biasing said first and second valves to first positions establishing such communication, said first valve being shiftable to a second position to interrupt such communication and vent said auxiliary actuator, a low pressure relief valve associated with said second control valve, said second control valve being shiftable to second and third positions to vent said auxiliary actuator through said low pressure relief valve and to directly vent said auxiliary actuator, respectively, a manual control lever, and one-way linkages interposed between said lever and said first and second valves to thereby shift each of such valves from its first position only when the other of the valves is in its first position, whereby said first valve may be used to control the locking of said differential assembly when an implement is being carried on said hitch and said second valve may be used to control the locking of said differential assembly when the hitch is locked out of transport position so that blow-off through the high pressure relief valve is prevented.

5. For use on a tractor having an elevatable implement hitch actuated by a main hydraulic system of the type described and which includes a pump, a main ram, a main control valve for the intake of the pump and a safety relief valve connected to the discharge of the pump; the combination of a differential drive assembly for transmitting power to a tractor's traction wheels, clutch means for locking and unlocking said differential assembly, an auxiliary actuator for engaging and disengaging said clutch means in response to the presence and absence of pressure fluid therein, first and second multi-position control valves serially connected between the discharge of the pump and said auxiliary actuator, a low pressure relief valve, a multi-position manual control lever, first and second linkages interposed between said lever and the respective first and second control valves to shift the latter, and conduit means for connecting said first and second valves for four positions of said lever (a) to directly connect the discharge of the pump with said auxiliary actuator, (b) to disconnect said auxiliary actuator from the pump discharge and vent the former, (c) to connect the pump discharge with said auxiliary actuator and vent the same through said low pressure relief valve, and (d) to directly vent the discharge of the pump and said auxiliary actuator, whereby said clutch means may be energized from the hitch hydraulic system whether or not an implement is being carried on the hitch linkage without blow-off through the high pressure relief valve.

6. The combination set forth in claim 5 further characterized in that said first linkage for controlling said first control valve is disposed in the path of one of the implement hitch components so as to be shifted to vent said actuator automatically in response to the elevation of the tractor hitch to transport position.

7. The combination set forth in claim 5 further characterized in that overruling control means are provided to shift said first linkage and thereby vent said actuator in response to a predetermined condition in the operation of the tractor requiring differential action between its traction wheels regardless of the setting of said control lever.

8. The combination set forth in claim 5 further characterized in that the tractor is provided with a brake operable by a pedal, and further including means responsive to the actuation of the brake pedal and operative on said first linkage to shift said first control valve and thereby vent said actuator notwithstanding the setting of said control lever.

9. The combination set forth in claim 5 further characterized in that the tractor is provided with steerable wheels positionably controlled by rotation of a steering column, and further including means responsive to the rotation of the steering column through a predetermined angle from its straight ahead position for shifting said first control valve and thereby venting said actuator regardless of the setting of said control lever.

10. The combination set forth in claim 5 further characterized in that the implement hitch is provided with overload release means, and further including means responsive to the overload release of the implement hitch for shifting said first control valve and venting said auxiliary actuator regardless of the setting of said control valve.

11. For use on a tractor having a draft controlled hydraulically actuated implement hitch of the type described which includes a pump and a safety relief valve, the combination of a differential drive assembly for transmitting power to the traction wheels of the tractor, clutch means for locking and unlocking said differential, a hydraulic actuator for engaging and disengaging said clutch means, first and second multi-position valves normally establishing direct communication between the discharge side of the pump and said actuator, a control lever and a first linkage positionable thereby to shift said first valve to cut-off the connection to the pump and to vent said actuator, a low pressure relief valve, and a second linkage positioned by said lever exclusively of said first linkage to shift said second valve to (a) vent said actuator through said low pressure relief valve to thereby prevent blow-off through said safety valve while said clutch means are engaged, and (b) directly vent said actuator to disengage said clutch means.

References Cited in the file of this patent

UNITED STATES PATENTS

| 1,758,806 | Saives | May 13, 1930 |
| 2,017,577 | Adams | Oct. 15, 1935 |
| 2,376,019 | Thomas | May 15, 1945 |
| 2,389,498 | Gates | Nov. 20, 1945 |

FOREIGN PATENTS

| 687,341 | Great Britain | Feb. 11, 1953 |